US009661517B2

(12) United States Patent
Stott et al.

(10) Patent No.: US 9,661,517 B2
(45) Date of Patent: May 23, 2017

(54) SYSTEMS AND METHODS FOR MOBILITY TESTING OF MU-MIMO

(71) Applicant: Ixia, Calabasas, CA (US)

(72) Inventors: Lester Noel Stott, Aloha, OR (US);
Thomas Alexander, Mulino, OR (US)

(73) Assignee: IXIA, Calabasas, CA (US)

( * ) Notice: Subject to any disclaimer, the term of this patent is extended or adjusted under 35 U.S.C. 154(b) by 0 days.

(21) Appl. No.: 14/746,733

(22) Filed: Jun. 22, 2015

(65) Prior Publication Data

US 2016/0373196 A1    Dec. 22, 2016

(51) Int. Cl.
*H04W 24/08*   (2009.01)
*H04W 24/06*   (2009.01)
*H04B 7/04*    (2006.01)
*H04B 17/336*  (2015.01)
*H04B 7/0452*  (2017.01)

(52) U.S. Cl.
CPC .......... *H04W 24/08* (2013.01); *H04B 7/0452* (2013.01); *H04B 17/336* (2015.01); *H04W 24/06* (2013.01)

(58) Field of Classification Search
CPC ..... H04W 24/06; H04W 24/08; H04W 24/00; H04B 7/0452
See application file for complete search history.

(56) References Cited

U.S. PATENT DOCUMENTS

| 7,890,821 B2 | 2/2011 | Music et al. |
| 9,083,454 B2 | 7/2015 | Wicker, Jr. et al. |

| 2006/0229018 A1 | 10/2006 | Mlinarsky et al. |
| 2007/0243826 A1 | 10/2007 | Liu |
| 2009/0094492 A1 | 4/2009 | Music et al. |
| 2009/0262719 A1 | 10/2009 | Shim et al. |

(Continued)

FOREIGN PATENT DOCUMENTS

| EP | 2 512 173 A1 | 10/2012 |
| EP | 2 597 794 A1 | 5/2013 |
| WO | WO 2015/050974 A1 | 4/2015 |

OTHER PUBLICATIONS

Notice of Allowance and Fee(s) Due for U.S. Appl. No. 14/043,799 (Mar. 3, 2015).

(Continued)

*Primary Examiner* — Ashley Shivers
(74) *Attorney, Agent, or Firm* — Jenkins, Wilson, Taylor & Hunt, P.A.

(57) ABSTRACT

Systems and methods are disclosed herein to provide communication test systems for the mobility testing of multi-user multiple-input multiple-output (MU-MIMO) radio frequency wireless data communication devices, systems and networks. In accordance with one or more embodiments, a test system containing an MU-MIMO traffic generator and analyzer is disclosed that includes a mobility effects scheduler operative in conjunction with a channel impairment simulator to perform tests related to mobile MU-MIMO devices such as wireless clients and terminals. Such a test system may offer improved capabilities, such as flexible measurements of mobility performance, more accurate assessments of MU-MIMO wireless channel utilization and data throughput, measurements on MU-MIMO devices under mobility stress, and automated measurements of MU-MIMO mobility testing.

19 Claims, 12 Drawing Sheets

(56) References Cited

U.S. PATENT DOCUMENTS

| | | |
|---|---|---|
| 2010/0285753 A1 | 11/2010 | Foegelle |
| 2012/0100813 A1 | 4/2012 | Mow et al. |
| 2013/0210474 A1 | 8/2013 | Kyösti |
| 2013/0286860 A1* | 10/2013 | Dorenbosch .......... H04W 24/06 370/252 |
| 2014/0086075 A1 | 3/2014 | Asokan et al. |
| 2014/0187260 A1 | 7/2014 | Jiang et al. |
| 2015/0092824 A1 | 4/2015 | Wicker, Jr. et al. |

OTHER PUBLICATIONS

Notification of Transmittal of the International Search Report and the Written Opinion of the International Searching Authority, or the Declaration for International Application No. PCT/US2014/058601 (Dec. 23, 2014).

Ex Parte Quayle Office Action for U.S. Appl. No. 14/043,799 (Dec. 3, 2014).

Notification of Transmittal of the International Search Report and the Written Opinion of the International Searchng Authority, or the Declaration for International Application No. PCT/US2016/028320 (Jul. 26, 2016).

Communication of European publication number and information on the application of Article 67(3) EPC for European Patent Application No. 14850849.2 (Jul. 13, 2016).

\* cited by examiner

SYSTEMS AND METHODS FOR MOBILITY TESTING OF MU-MIMO

TECHNICAL FIELD

The subject matter herein relates generally to the test and measurement of wireless data communication systems, and more particularly to systems and methods of analyzing the performance of multi-user multiple-input multiple-output wireless systems, including but not limited to systems containing mobile wireless devices.

BACKGROUND

Multiple Input Multiple Output (MIMO) wireless systems utilize the spatial properties of the RF transmission channel to transmit parallel, independent streams of digital data from a wireless transmitter to a wireless receiver, greatly increasing the capacity of the system. MIMO is seeing widespread use in high-speed wireless digital transmission systems. The RF environments in which MIMO systems operate contain reflective, refractive and diffractive objects which may affect the RF signal and set up multiple propagation modes in the channel. Each propagation mode may be used to carry an independent RF signal. The actual number of propagation modes that are possible to be employed may depend on the number of antennas in the wireless transmitter and receiver, as well as other aspects such as signal-to-noise ratio, co-channel and adjacent channel interference, and the variability of the channel statistics.

FIG. 1 is an illustrative representation of a MIMO channel environment containing MIMO wireless transmitters 100 and 102, each with multiple antennas, transmitting signals to MIMO wireless receivers 101 and 103, also with multiple antennas. It is understood that transmitters 100 and 102 and receivers 101 and 103 may be contained within wireless terminals or basestations. The environment may contain scatterers 104 that may reflect RF signals 105. The pattern of scatterers may enable transmitter 100 to utilize multiple independent RF paths to receiver 101; likewise, a different pattern of scatterers may enable transmitter 102 to utilize different RF paths to receiver 103. The scatterers may thus create different propagation modes for the RF signals 105. With the availability of enough antennas and radio chains to drive them, MIMO transmitters 100 and 102 may split data into parallel streams and transmit each stream on different propagation modes. With knowledge of the channel properties as well as the transmit encoding algorithms used, MIMO receivers 101 and 103 may separate, decode and combine these independent data streams.

The capacity of a MIMO system may therefore be a multiple of the capacity of an equivalent Single Input Single Output (SISO) system operating using the same RF channel. It should be appreciated that the sets of three antennas for each of MIMO transmitters 100 and 102 and MIMO receivers 101 and 103 are only for representational purposes, and any feasible number of antennas may be employed in practice, with the maximum channel capacity being determined by the numbers of antennas and the properties of the channel. A MIMO channel with N transmit and M receive antennas can be represented as an N×M matrix of complex coefficients, and the number of independent data streams is constrained to the lower of N and M.

In actual practice, the available RF channel modes seen by a MIMO transmitter can be much more than a single transmitter/receiver pair can efficiently utilize. This may be particularly true if the MIMO transmitter has more antennas than the corresponding MIMO receiver, (i.e., N>M in the preceding formulation), in which case the extra transmit antennas cannot be used to transmit additional data streams to the receiver. Multi-user MIMO (MU-MIMO) systems may therefore try to employ these extra transmit channel modes to simultaneously send data to additional receivers, and thereby utilize the extra antennas. An MU-MIMO transmitter will establish an estimate of the separate channels between itself and every other receiver it wishes to transmit data to. The MU-MIMO transmitter will then utilize the different propagation modes that may exist between each transmitter/receiver pair to transmit an independent data stream simultaneously.

FIG. 2 depicts a high-level view of a possible MU-MIMO environment with one MU-MIMO transmitter 120 having a larger number of antennas, along with MU-MIMO receivers 121, 122, 123 and 124, each having a smaller number of antennas. The RF environment may contain a number of scatterers 125 that provide multiple independent signal paths 126 between transmitter 120 and receivers 121, 122, 123, 124. In order for MU-MIMO to be employed to all of the receivers simultaneously, the propagation modes utilized between transmitter 120 and each of receivers 121, 122, 123, 124 must be orthogonal to each other—i.e., if K signal paths are desired to be used concurrently, the channel matrix seen at transmitter 120 must have as at least K separate usable eigenvalues. It may then be possible for transmitter 120 to shape the transmitted signal in such a way that each receiver can maximize the Signal to Noise Ratio (SNR) of the signal directed to itself, and reduce the SNR of all other signals. This in turn will allow each receiver to separate the signals directed to itself and decode them while rejecting the other signals; for example, using a process of successive cancellation. In this case, transmitter 120 may be able to transmit wireless data streams to receivers 121, 122, 123, 124 simultaneously using the same carrier frequency.

MU-MIMO systems may need to obtain and utilize an accurate estimate of the channel between every transmitter/receiver pair that is to communicate. These estimates may have to be updated frequently, as channel conditions change, or as the transmitter and/or receiver move to different physical locations. Estimation of the RF channel between every transmitter/receiver pair may be performed by a process of channel sounding. Channel sounding may consist of: transmitting a packet with known data from the transmitter to the receiver; accurately measuring the received signal for the packet at the receiver; using these measurements to deduce the channel matrix currently existing between the transmitter and receiver; and returning the measured channel information, which may include the channel matrix, to the transmitter for use in shaping the transmitted signal. If the communication protocol utilizes Orthogonal Frequency Division Modulation (OFDM), the analysis may be performed for each OFDM subcarrier separately.

With reference to FIG. 3, the typical channel sounding process for an exemplary MU-MIMO wireless technology such as IEEE 802.11 Wireless Local Area Network (WLAN) may proceed as follows. Activities performed by an MU-MIMO transmitter, such as that contained within a WLAN Access Point (AP), may be represented by timeline 140; activities performed by an MU-MIMO receiver, such as that contained within a WLAN client, may be similarly represented by timeline 141. The sounding process may be triggered at 142, causing the MU-MIMO transmitter at point 143 to transmit a sounding packet 144 (in IEEE 802.11, known as a Null Data Packet or NDP) comprising known fixed test data to the MU-MIMO receiver. The MU-MIMO receiver may receive the packet at 145 and may perform analysis on it at 146 to calculate the channel matrix as well as the beamforming matrix that represents the results of the sounding process. At 147, the MU-MIMO receiver may transmit the beamforming matrix coefficients back to the MU-MIMO transmitter in an information packet 148 (in IEEE 802.11, known as a beamforming report), which may then be received by the MU-MIMO transmitter at 149. These coefficients may then be extracted and processed, and the processed data may finally be used to set up the transmit precoder within the MU-MIMO transmitter at 150. Once the precoder has been properly set up, the MU-MIMO transmitter may transmit precoded data packet 151 to the MU-MIMO receiver. As the RF channel between the MU-MIMO transmitter and receiver has been determined by the sounding process, the precoder may be configured with the proper coefficients for utilizing this channel to maximize the SNR at the MU-MIMO receiver. Therefore, the precoded MU-MIMO transmit packet 151 may be optimally received at the MU-MIMO receiver, and any other packet sent to any other destinations may be greatly attenuated or suppressed.

The process of using the RF channel data by the MU-MIMO transmitter to properly shape the transmitted signal to be directed to a specific MU-MIMO receiver is called beamforming. For each combination of transmitter and receiver, different RF channel data will be used to beamform transmitted signals differently. If the channel matrices between each MU-MIMO transmitter and receiver pair are orthogonal to each other, then every MU-MIMO receiver will be able to independently and successfully receive the specific signal sent to it. However, if the RF channel matrices between any two MU-MIMO receivers are non-orthogonal, then the signals sent simultaneously to these two receivers may 'smear' into each other (i.e., share utilized channel propagation modes) and cannot be recovered.

In practical wireless transmission systems, MU-MIMO may represent a tradeoff between the number of antennas and RF chains available on the transmitters and receivers, the number of available data streams to be transmitted, and the properties of the RF environment. The maximum degree of MU-MIMO is limited by the number of antennas and corresponding transmit RF chains on the MU-MIMO transmitter. For example, if a transmitter has 4 antennas driven by 4 independent RF chains, then it may transmit 4 independent single spatial streams (i.e., 1×1 MIMO) to 4 separate receivers, or it may transmit a single 4×4 MIMO stream to a single receiver. Intermediate combinations also exist, such as two independent 2×2 MIMO streams to 2 receivers, and so on. FIG. 4 shows an exemplary scenario, with MU-MIMO transmitter 160 having 4 antennas in an RF environment with MU-MIMO receiver 161 with 4 antennas, MU-MIMO receivers 162 and 163 with 2 antennas each, and MU-MIMO receivers 164, 165, 166, 167, each with 1 antenna. In this situation, transmitter 160 may either communicate with receiver 161, or with both of receivers 162 and 163 in parallel, or with all four of receivers 164, 165, 166, 167 in parallel.

One purpose of implementing MU-MIMO in a wireless communication system is to increase total system capacity without requiring wireless terminals to have more antennas. This may be particularly true in situations where individual wireless terminals may have much lower data capacity than an access point or basestation (as is common in WEE 802.11), and so it may be efficient to utilize the RF channel capacity by concurrently sending data streams to multiple terminals simultaneously. While it is technically feasible to implement perfectly symmetric MU-MIMO (i.e., all wireless devices are able to simultaneously transmit to sets of other devices), this mode is not currently implemented due to the extreme complexity incurred. For example, in IEEE 802.11, MU-MIMO may only be used for downstream data transfers from Access Points (APs) to client devices, whereas upstream data transfers from clients to APs may be performed sequentially without the use of MU-MIMO. This may be an acceptable tradeoff, as most data traffic in IEEE 802.11 networks is expected to flow in a downstream direction from AP to clients. Further, this approach may significantly reduce the overall system complexity.

In order for MU-MIMO to function properly, it may be necessary for the MU-MIMO system to accurately and frequently measure RF channel matrices. It may also be essential for the MU-MIMO transmitter to properly schedule data to be concurrently sent to different receivers based on the properties of these channel matrices. For example, receivers that have non-orthogonal channels existing between themselves and the MU-MIMO transmitter cannot have data sent to them in the same transmission period. (In the worst case, if the RF environment contains only non-orthogonal channels, then MU-MIMO cannot be used; transmissions will have to be made in serial order.) These decisions may have a large impact on overall system efficiency. Accurate measurements of RF channel properties and scheduling of data transfers may therefore place a heavy computational load on MU-MIMO systems, and may interfere with their ability to transfer data traffic.

FIG. 5 illustrates a conceptual view of some different combinations that an exemplary MU-MIMO transmitter 160 with 4 antennas may need to consider prior to each transmission period. At time T1, transmitter 160 may choose to send a single packet 171 to a 4×4 MU-MIMO receiver 161, utilizing all four of its antennas to create 4 spatial streams to a single receiver. At time T2, transmitter 160 may utilize 2 of its antennas to transmit packet 172 with 2 spatial streams to receiver 162 with 2 antennas, and simultaneously use the remaining 2 antennas to transmit a second packet 173 with an additional 2 spatial streams to receiver 163. At time T3, transmitter 160 may again utilize 2 antennas to transmit packet 174 with 2 spatial streams to receiver 162, but then elect to use 1 antenna each to transmit two packets 175, 176 to two separate receivers 164, 165 respectively. Finally, at time T4, transmitter 160 may use each of its 4 antennas to transmit 4 parallel packets 177, 178, 179, 180 (each occupying a separate spatial stream) to each of 4 receivers 164, 165, 166, 167. It is apparent that a wide variety of scheduling choices may be available to an MU-MIMO transmitter during a transmission period, and proper scheduling of data traffic and stream counts may have a significant impact on system performance.

MU-MIMO transmitters may also need to consider factors such as modulation rates when performing MU-MIMO scheduling. Taking the IEEE 802.11 wireless protocol as an exemplary instance, the availability of orthogonal channels may render it feasible to simultaneously transmit data packets to multiple receivers; however, if some of the receivers only support 20 MHz channel bandwidths while others support 80 MHz channel bandwidths, then mixing data to these receivers within the same MU-MIMO transmission period may cause a significant reduction in efficiency. Similarly the optimum modulation rate may vary from receiver to receiver, and it may be inefficient to mix widely varying modulation rates within the same MU-MIMO transmit period. All of these may render MU-MIMO transmit scheduling complex yet critical to system performance.

MU-MIMO systems may thus need to conduct accurate and frequent estimation of the RF channel properties existing between every transmitter/receiver pair to facilitate efficient scheduling. When the bit error rate between a transmitter and receiver increases significantly, this may indicate that the RF channel has changed and needs to be re-estimated. The high computational complexity of channel estimation may make it very expensive to estimate frequently, and channel estimation may become a significant computational bottleneck. RF channel estimation conducted through sounding handshakes may also place a high load on the RF medium itself, especially when the number of transmitter/receiver pairs grows large. Scheduling errors or inefficiencies may substantially reduce the utilization of MU-MIMO system throughput. Finally, failing to detect and avoid non-orthogonal RF channels may increase the system error rate and consequently reduce throughput.

It may therefore be advantageous to test all of these factors when determining how well an MU-MIMO system can support mobility within a wireless environment. Testing may be necessary to ensure that an MU-MIMO transmitter Device Under Test (DUT) can support the computational complexity required to properly calculate the parameters used by a transmit beamformer (precoder). Tests may further be needed to check that the DUT can detect and respond to channel changes rapidly. It may further be required to assess whether the DUT can maintain the requisite data transfer bandwidth while coping with the frequent channel re-sounding needed to cope with mobile MU-MIMO receivers. In addition, it may be useful to determine whether the DUT can classify channel parameters as orthogonal and non-orthogonal matrices and schedule transmissions accordingly. Verifying whether the DUT scheduler can maximize channel efficiency by rapidly and properly selecting simultaneously transmitted packets during different mobility scenarios may also be desirable.

Unfortunately known approaches are unable to satisfy these requirements. One approach known in the prior art is to interpose multiple dedicated MIMO RF channel simulators (also known as faders) between the DUT and multiple test receivers. Each channel simulator may set up a desired RF channel between the DUT and its corresponding test receiver, which may then be measured by sounding packet exchanges, after which the DUT may beamform signals to the test receiver appropriately. Unfortunately this setup is very difficult to extend to a large number of receivers, as it is prohibitively expensive. Further, the simulated RF channel properties degrade rapidly as multiple channel simulators are interconnected. Cross-talk and coupling may frequently occur between channel simulators, leading to non-orthogonal channels being induced and preventing MU-MIMO from being utilized. Finally, it is very difficult using this approach to set up mobility scenarios. This approach has no protocol awareness, which prevents the sounding behavior of the system from being linked to protocol factors such as rate adaptation or disassociation/reassociation.

Another approach is to interpose a single external MU-MIMO RF channel simulator between the DUT and an MU-MIMO test system. However, it may be difficult or impossible to use such an approach in IEEE 802.11 systems because the sequence of packets being transmitted by a MU-MIMO transmitter cannot be predicted. Hence it may not be possible to utilize the correct channel model for the correct stream. Further, it is difficult for a conventional channel simulation approach to concurrently impose multiple channel models on multiple data streams carried within the same RF signal generated by an MU-MIMO transmitter DUT. Finally, such a channel simulator is unsuitable for testing mobility; the high dynamic range difference between different MU-MIMO transmit/receive pairs may frequently exceed the capabilities of the analog circuits within the simulator.

Yet another approach is to incorporate an MU-MIMO channel simulator within the MU-MIMO test system itself. An exemplary instance of such an approach may be depicted in commonly-assigned co-pending U.S. patent application publication no. 2015/0092824, the disclosure of which is incorporated herein by reference in its entirety. However, such an approach has no protocol awareness; for example, it cannot link the behavior of the IEEE 802.11 protocol functions with that of the MU-MIMO channel simulation. It also does not provide a means to simulate spatial mobility of MU-MIMO terminals. In addition, it cannot distinguish between orthogonal and non-orthogonal channels, and thus cannot provide an approach to testing the response of a DUT to a mixture of such channels. Finally, it does not provide a way to induce channel sounding at high rates in order to create the effect of moving terminals or changing channel conditions.

The known methods of assessing the quality of MU-MIMO wireless systems in the presence of mobile terminals therefore suffer from serious deficiencies. There is hence a need for improved wireless data communication test systems and methods. A test system that has the ability to simulate multiple MU-MIMO RF transmission channels for scenarios including multiple mobile MU-MIMO terminals may be desirable. It may be preferable for a test system to present orthogonal RF channels, non-orthogonal RF channels, or a mixture of both. Such a system may preferably link wireless protocol behavior with sounding behavior to test the triggering of sounding exchanges by mobility, and also may further link wireless protocol behavior with the simulated RF channels to test the ability of the DUT to optimize packet scheduling. In addition, it may be desirable for such a system to control the absolute and relative SNR within the channel estimate to simulate the effect of mobility and distance on the reported RF channel. Finally, a system that can measure modulation rates and data throughput while controlling RF channel effects may be desirable, to facilitate the testing of the efficiency of MU-MIMO transmitters in the presence of multiple mobile MU-MIMO terminals.

SUMMARY

Systems and methods are disclosed herein that may provide improved techniques for performing testing of MU-MIMO wireless data communication devices, systems and networks. Such techniques may enable more accurate testing of the mobility performance of such devices and systems with lower complexity, and may facilitate the testing of MU-MIMO systems with multiple clients. The systems and methods disclosed may further extend the range and nature of the tests that may be performed, and may also allow automated tests to be conducted in a controlled and repeatable manner.

In accordance with an aspect of an embodiment, a wireless traffic generator and analyzer is disclosed that may be operative to perform tests upon an MU-MIMO Device Under Test (DUT) in a controlled RF environment. The analyzer may contain: radio front-end functions to interface with the DUT; receive MU-MIMO digital signal processing functions, to decode radio signals received from the DUT; receive packet datapath and test traffic analyzer functions for wireless protocol and test traffic analysis; test traffic generation functions, which generate test traffic and wireless protocol packets; transmit MU-MIMO digital signal processing functions, to encode signals transmitted to the DUT by the radio front-end; transmit channel simulation functions; channel model storage and impairment simulation functions, which impose and modify channel characteristics reported to the DUT; protocol engine and sounding packet processing functions, which implement the wireless packet protocol including beamforming sounding exchanges; and mobility scheduler effects functions, which control, coordinate and schedule the mobility effects to be created.

The system may be further operative to couple multiple types of mobility effects to provide a more realistic simulation of mobile clients and terminals, or to accomplish certain test goals.

Preferably, the wireless traffic generator and analyzer may represent multiple MU-MIMO wireless clients or terminals, with different simulated RF channels being interposed between each simulated client or terminal and the DUT. The wireless traffic generator and analyzer may also cause the DUT to perform sounding measurements to any selected subset of clients or terminals, and may return any set of predetermined RF channel parameters responsive to these sounding measurements. The wireless traffic generator and analyzer may also modify the returned RF channel parameters in accordance with a predetermined measurement procedure. Such a wireless traffic generator and analyzer may present an RF environment to the DUT containing multiple simulated test clients, and may dynamically modify the parameters of the simulated RF channels between individual clients to simulate the impact of mobility upon these channels. Further, it may make measurements at specific times or upon the occurrence of specific events and coordinated with the changes in the simulated RF channels, in order to accomplish a variety of test objectives in a repeatable fashion.

Advantageously, the RF channel parameters sent to the DUT may be configured on a per-test-client basis to simulate any mixture of orthogonal RF and non-orthogonal RF channels. The RF channel parameters sent to the DUT may be dynamically adjusted to create the effect of individual test clients transitioning between orthogonal and non-orthogonal channels in the course of performing a test.

Advantageously, RF channel parameters returned by the sounding functions, and applied to the transmitted test data packets, may be linked to wireless protocol behavior, which may permit the wireless traffic generator and analyzer to create different test scenarios involving multiple MU-MIMO clients or terminals, and thereby determine the ability of the DUT to properly schedule MU-MIMO data transmissions.

Advantageously, the simulated RF channels for individual simulated MU-MIMO clients or terminals may be caused to vary from flat to non-flat, or to vary from near to far, which may enable the wireless traffic generator and analyzer to determine the performance of the DUT when coping with near/far situations and RF channel ripple.

Advantageously, the wireless traffic generator and analyzer may perform throughput and physical layer data rate tests coordinated with modification of returned RF channel parameters simulating the mobility of MU-MIMO clients, which may allow the repeatable measurement of DUT data throughput and modulation rate in a mobile MU-MIMO environment.

Advantageously, the wireless traffic generator and analyzer may vary the rate at which sounding exchanges are triggered, and may further vary the method of triggering sounding exchanges, which may enable the measurement of the ability of the DUT to sustain rapid RF channel calculations.

BRIEF DESCRIPTION OF THE DRAWINGS

The detailed description herein of the features and embodiments are best understood when taken in conjunction with the accompanying drawings, wherein.

It should be understood that like reference numerals are used to identify like elements illustrated in one or more of the above drawings.

DETAILED DESCRIPTION

Figure 1:
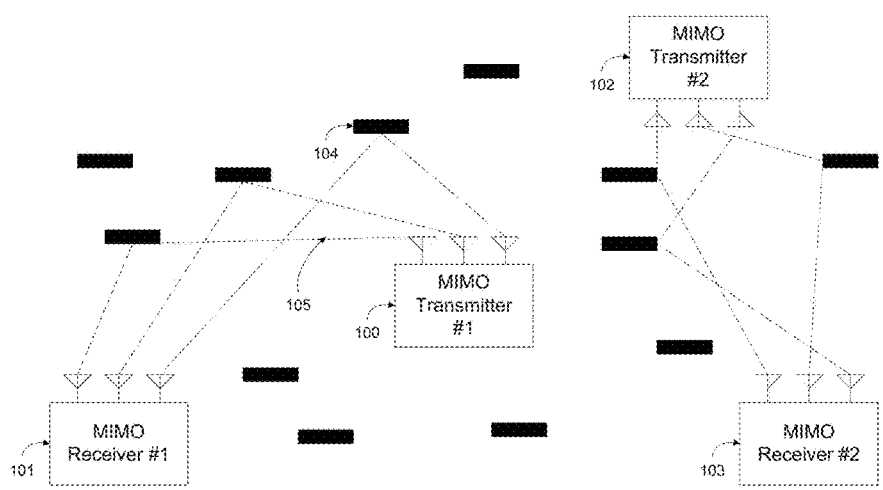
FIG. 1 illustrates a simplified view of MIMO transmitters and MIMO receivers operating in an RF channel environment.
Figure 2:
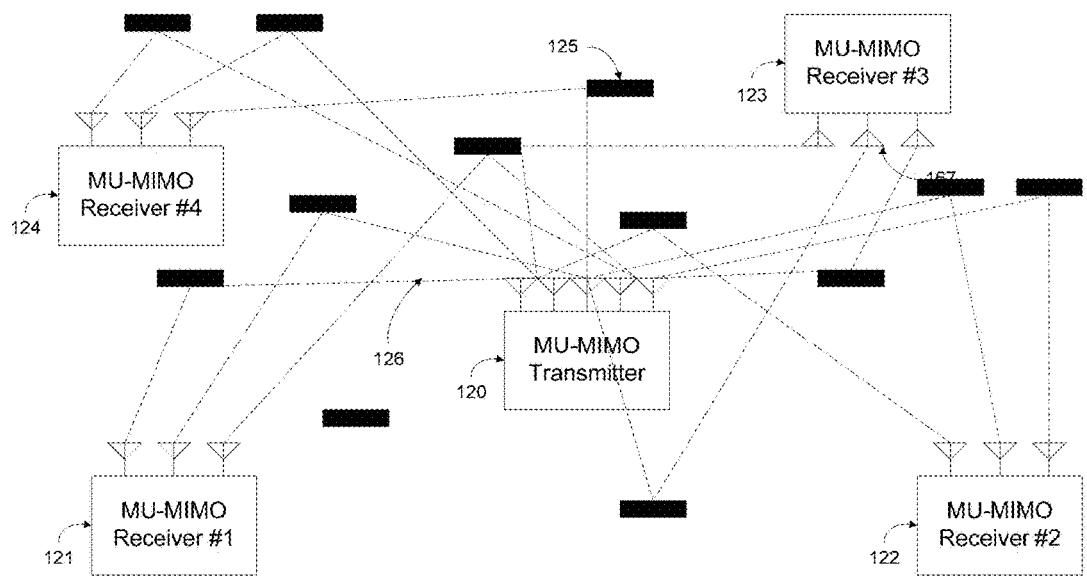
FIG. 2 depicts an exemplary MU-MIMO system environment comprising an MU-MIMO transmitter and multiple MU-MIMO receivers within a scattering environment.
Figure 3:
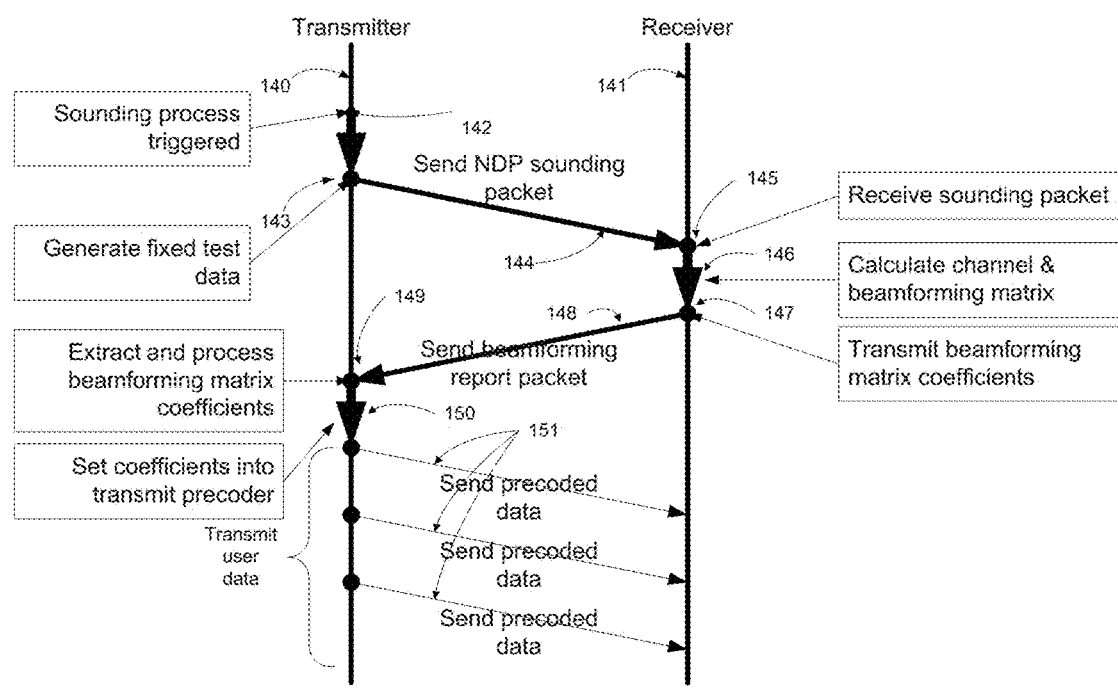
FIG. 3 represents an exemplary sequence diagram of a sounding process that may be performed between an MU-MIMO transmitter and receiver.
Figure 4:
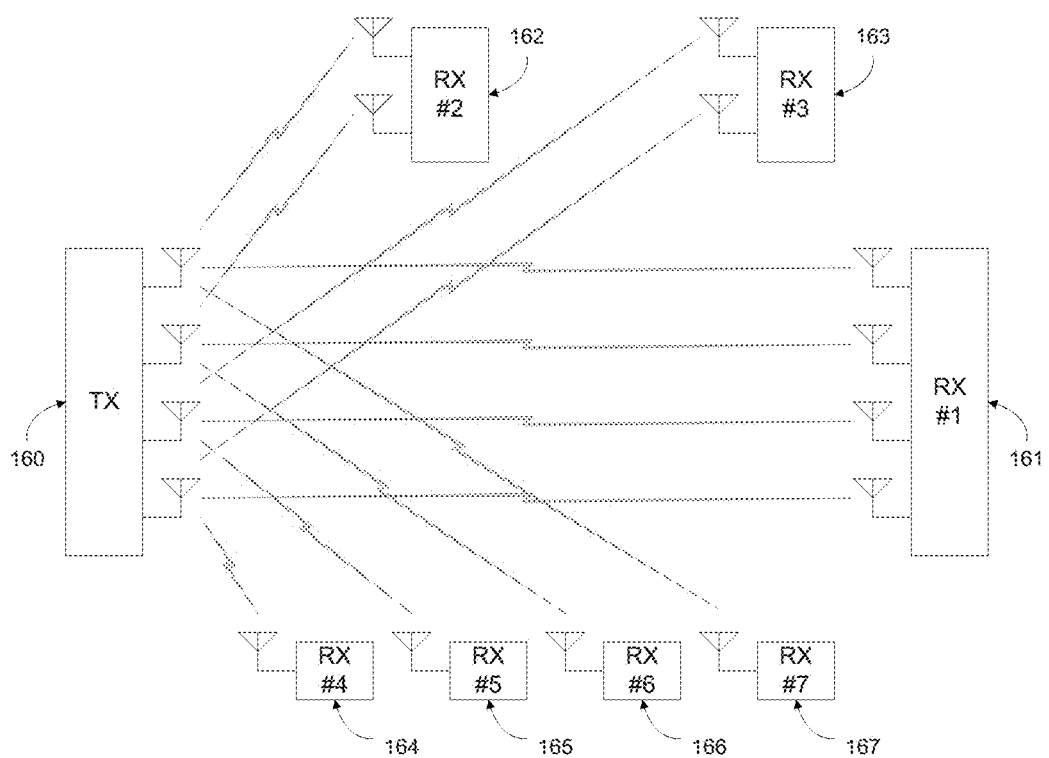
FIG. 4 provides a conceptual view of an MU-MIMO transmitter that may be simultaneously communicating with several MU-MIMO receivers of different types.
Figure 5:
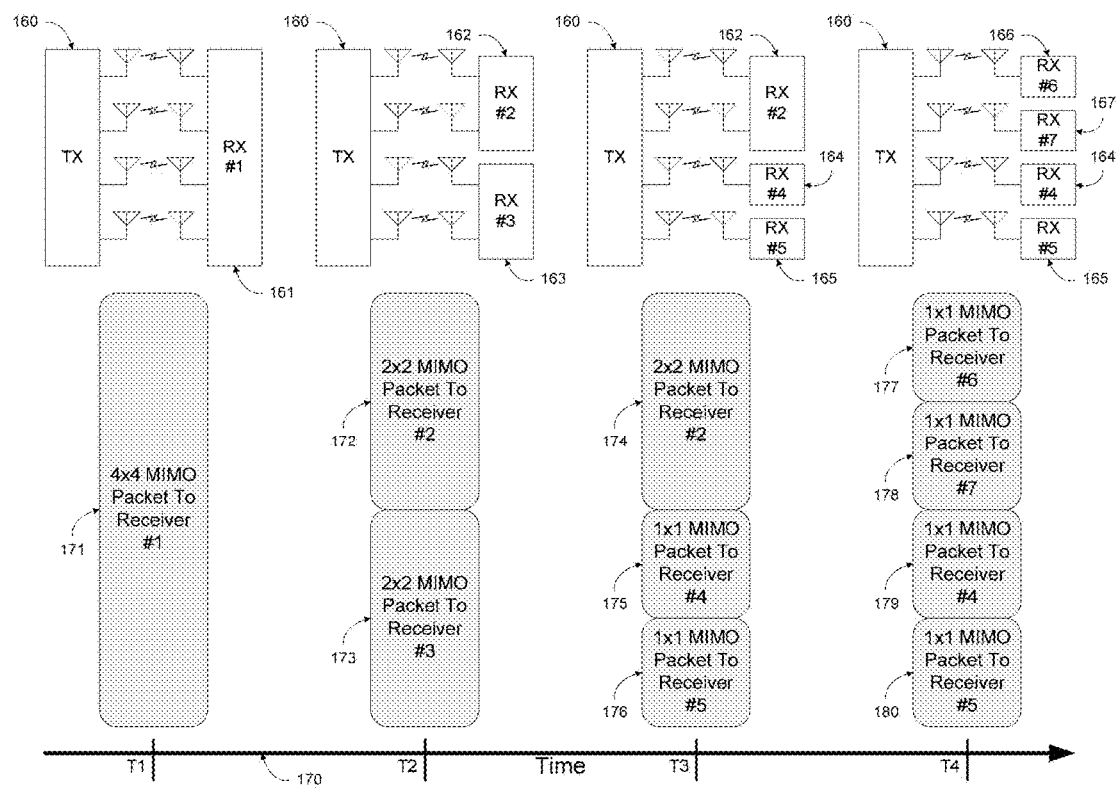
FIG. 5 illustrates some packet scheduling combinations that may be utilized by an MU-MIMO transmitter when concurrently transmitting data to different combinations of MU-MIMO receivers.
Figure 6:
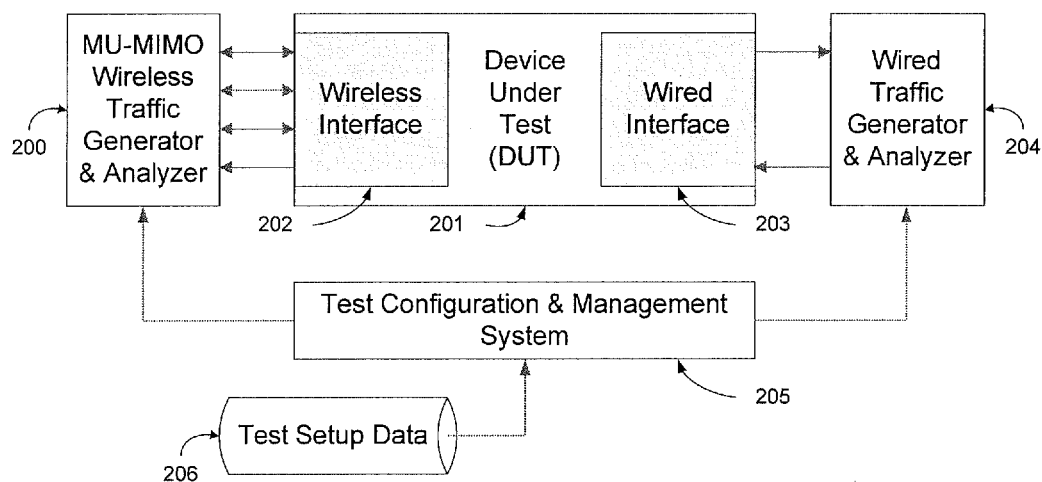
FIG. 6 depicts an example of an MU-MIMO mobility test system comprising an MU-MIMO wireless traffic generator and analyzer, a wired Ethernet traffic generator and analyzer, a test configuration system using stored test setup data, and a wireless DUT.

With reference to FIG. 6, a high-level diagram of an exemplary arrangement of a Multi User (MU) Multiple Input Multiple Output (MIMO) wireless mobility test system is represented. This may comprise MU-MIMO wireless traffic generator and analyzer (TGA) 200, wired TGA 204, test configuration and management system 205, test setup data 206, and device under test (DUT) 201. DUT 201 may be equipped with MU-MIMO radio interface 202 and wired interface 203, which may be interfaced to wireless TGA 200 and wired TGA 204 respectively. Test configuration and management system 205 may obtain information for configuring and executing a desired test from test setup data 206, and may utilize this information to configure and control wireless TGA 200 and wired TGA 204, and read test results from wireless TGA 200. Wireless TGA 200 may simulate one or more wireless clients or terminals to be presented to DUT 201. Methods of simulating wireless clients and terminals are well known in the prior art and will not be described here.

As represented in FIG. 6, wireless TGA 200 and wired TGA 204 may be interfaced to DUT 201 by means of cables to provide a test environment that is repeatable and free of external interference, signals or traffic. When testing DUT 201 that acts as an IEEE 802.11 Access Point (AP), for example, wireless TGA 200 may implement the IEEE 802.11 (Wireless LAN) protocol and wired TGA 204 may implement the IEEE 802.3 (Ethernet) protocol. However, it should be understood that any appropriate protocols may be used on the wireless and wired interfaces of DUT 201; as another example, wireless TGA 200 may implement the Third Generation Partnership Project (3GPP) Long Term Evolution (LTE) protocol, if DUT 201 is a cellular basestation or enhanced Node-B (eNB).

The use of a wired TGA in conjunction with a wireless TGA may permit end-to-end traffic measurements to be made, for example when assessing the throughput performance of DUT 201 under mobility situations. It may also simplify the injection of upstream or downstream traffic when it becomes necessary to trigger channel change situations during mobility using protocol interactions. However, the use of a wired TGA may not be required for all test scenarios, and may not be needed depending on the wireless protocol being tested. For instance, in IEEE 802.11 MU-MIMO mobility testing, it may be possible to exchange traffic between two simulated wireless IEEE 802.11 clients using a wireless TGA. In these situations it may be feasible to generate the traffic required for mobility performance measurements and the protocol interactions required to trigger channel changes without using a wired TGA.

Figure 7:
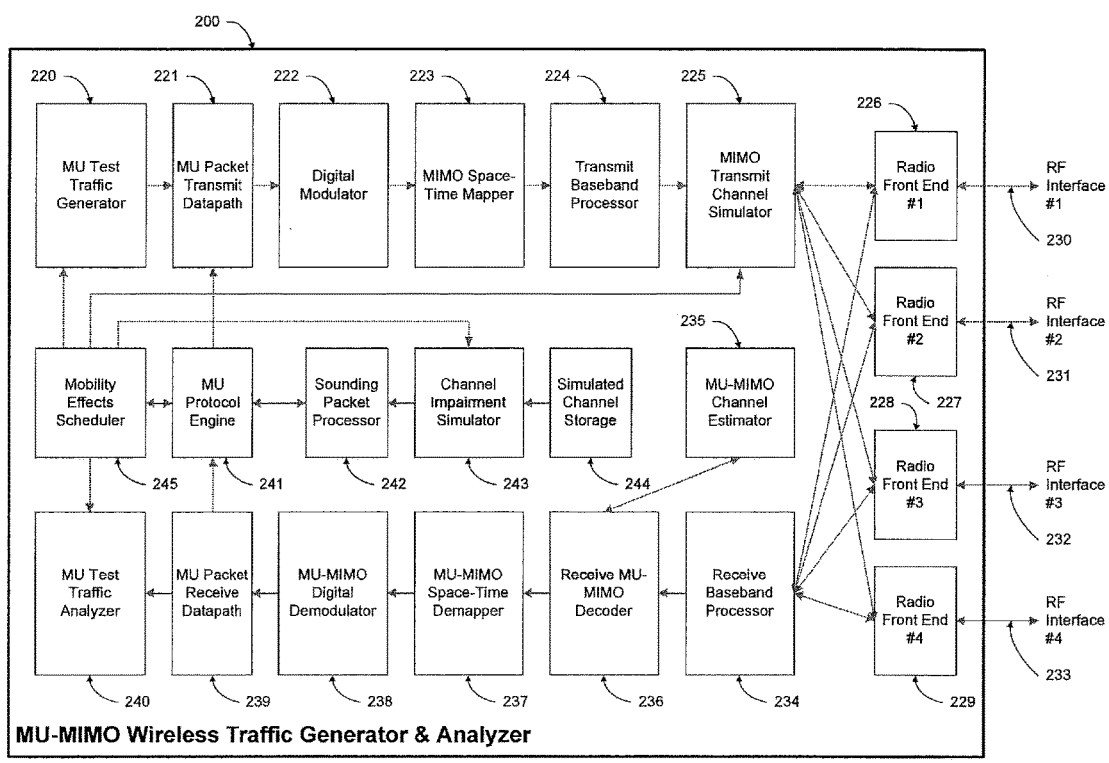
FIG. 7 presents an exemplary block diagram of an MU-MIMO mobility test system that includes MU-MIMO traffic generation, analysis and test control functions.

Turning now to FIG. 7, an exemplary block diagram of a possible embodiment of an MU-MIMO wireless TGA 200 that may be utilized for MU-MIMO mobility measurements for wireless protocols such as IEEE 802.11 is represented. MU-MIMO wireless TGA 200 may be interfaced to a wireless DUT (not shown) by RF cables 230, 231, 232, 233, and may generate and receive signals to simulate the effect of multiple users (e.g., IEEE 802.11 clients or LTE User Equipment) attempting to communicate with the wireless DUT. RF cables 230, 231, 232, 233 may serve to transport the signals from RF front ends 226, 227, 228, 229 respectively, representing four MIMO radio chains numbered 1 through 4. It should be understood, however, that while four RF interfaces and four radio front-ends are depicted in FIG. 7, the descriptions herein are not constrained to a specific number of RF interfaces and may be applied to any number of radio front-ends and RF interfaces required to achieve the desired degree of MIMO. Further, the number of users being simulated by wireless TGA 200 may be any number desired by the testing being performed.

With further reference to FIG. 7, wireless TGA 200 may comprise: MU test traffic generator 220 that may generate various types of MU test packet streams originating from multiple simulated clients or terminals; MU packet transmit datapath 221 that encapsulates MU test packet streams into wireless data frames, and may also generate control and management frames required by the wireless protocol itself; digital modulator 222 that may serialize and modulate digital information within transmitted packets into symbols to implement any requisite channel coding; MIMO space-time mapper function 223 that may segment and adapt modulated information symbols to map them to one or more channel propagation modes; transmit baseband processor 224 that may implement digital signal processing at baseband for the wireless protocol being employed; and MIMO transmit channel simulator 225, that may impose the effects of RF channels upon transmitted signals at the baseband level, thereby simulating propagation of these signals through real RF channels. The output of MIMO channel simulator 225 may be fed to radio front ends 226, 227, 228, 229, which may transform the signals from digital to analog, upconvert, filter, amplify and finally output the transmitted data on the RF interfaces.

In the receive direction, wireless TGA 200 may receive RF signals from the MU-MIMO DUT via RF cables 230, 231, 232, 233, and may convert from RF analog to digital baseband domain via RF front-ends 226, 227, 228, 229. Such processing may include steps such as low-noise amplification, downconversion, filtering, and analog to digital conversion (digitization). Digitized signals may be fed to receive baseband processor 234, which may implement digital signal processing at baseband for the wireless protocol being employed. Receive MU-MIMO decoder 236, which may utilize MIMO channel estimates provided by MU-MIMO channel estimator 235, may invert the effects of the MIMO propagation channel upon signals from the DUT. MU-MIMO space-time demapper 237 may extract the different symbol information streams imposed upon the channel transmission modes by the DUT, and may further combine them to create single information streams for each user. MU-MIMO digital demodulator 238 may process these information streams and convert them back into digital data streams. MU packet receive datapath 239 may decapsulate the digital data streams into packets for different users, and further perform wireless protocol functions that may be required. MU test traffic analyzer 240 finally may obtain test data streams from MU packet receive datapath 239, and may make appropriate measurements on these test data streams. An example of such a measurement may be a throughput measurement.

Wireless TGA 200 may further contain: MU protocol engine 241, that may implement wireless packet-level protocol functions required by the wireless protocol being supported, an example being authentication and association of an MU-MIMO client with the DUT; sounding packet processor 242, that may implement sounding packet exchanges with the DUT in order to present the latter with desired RF channel estimates when necessary; channel impairment simulator 243, that may be configured to impose some desired RF channel impairment on RF channel estimate values presented to the DUT by sounding packet processor 242; and simulated channel storage 244, that may contain one or more simulated RF channels to be associated with one or more simulated users. Finally, mobility effects scheduler 245 may be used within wireless TGA 200 to control and coordinate the actions of the different elements, such as channel impairment simulator 243, MIMO transmit channel 225, MU test traffic generator 220, MU test traffic analyzer 240, and MU protocol engine 241. Mobility effects scheduler 245 may thereby be operative to cause the effects of MU-MIMO mobility to be simulated in the RF signals presented to the wireless DUT.

Simulated channel storage 244, in conjunction with channel impairment simulator 243, may be operative to simulate any type of RF channel whose parameters are to be returned in beamforming reports transmitted in response to sounding packets received from the DUT. An exemplary use of simulated channel storage 244 is to hold a base RF channel model for each individual MU client. Different MU clients may have the same or different base RF channels. An exemplary use of channel impairment simulator 243 is to modify this base RF channel on a per-client basis in response to control commands received from mobility effects scheduler 245, to inject the effects of variations in the base RF channel over time. A possible reason to inject RF channel variations may be to simulate the effect of one or more MU clients moving about in an actual spatial environment, with consequent changes in the RF channel or channels that may exist between the client or clients and the DUT. These changes may result in different beamforming reports returned by the clients to the DUT in sounding packet exchanges over time. Such an arrangement may be able to present orthogonal RF channels for all MU-MIMO streams, non-orthogonal channels for all MU-MIMO streams, a mixture of both, or even a changing mixture over time. Further, the channel models applied by MIMO transmit channel simulator 225 may be modified by mobility effects scheduler 245 in conjunction with the RF channel variation commands sent to channel impairment simulator 243, thereby modifying the characteristics of the RF signals transmitted for different simulated clients to the DUT, which may further improve the realism of the simulation, or may be used to trigger activities such as sounding packet exchanges by the DUT.

Figure 8:
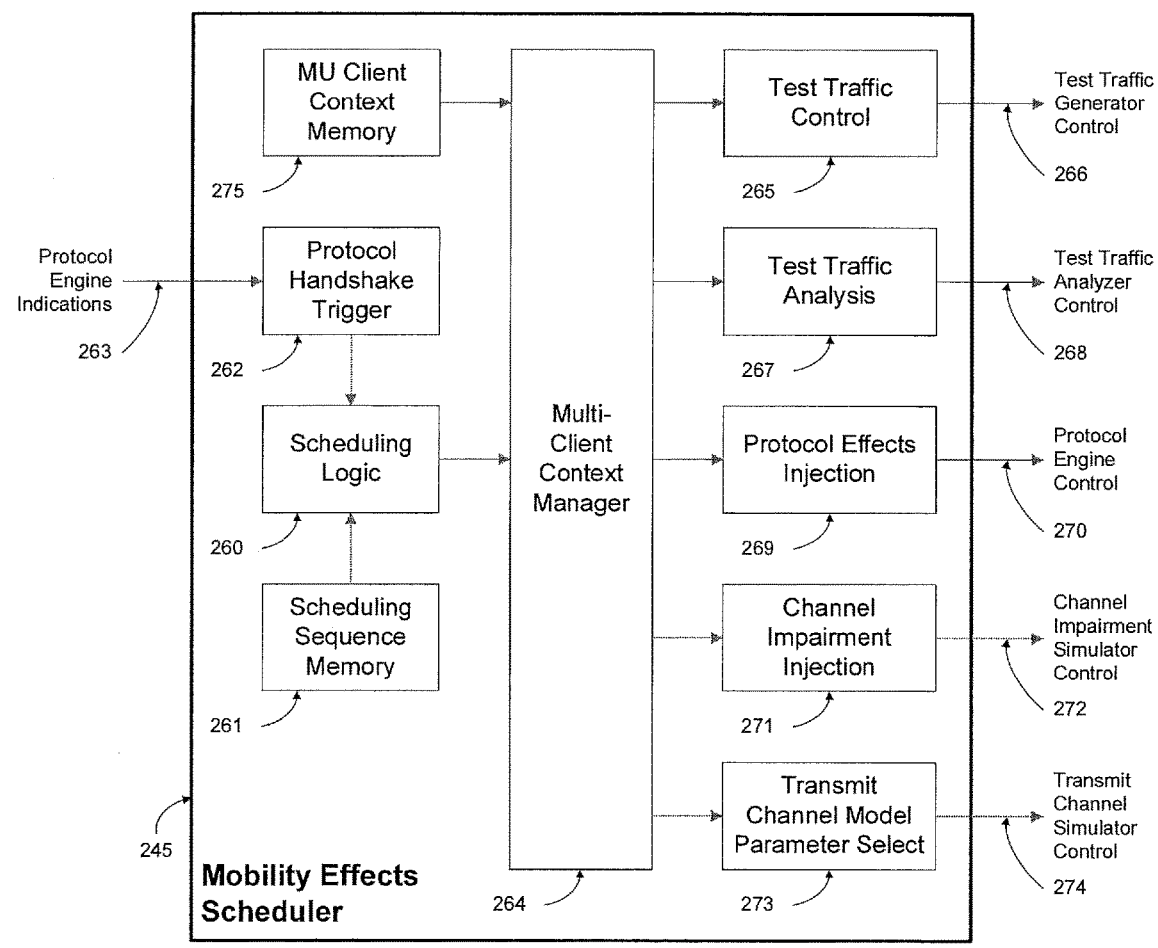
FIG. 8 illustrates an aspect of an MU-MIMO mobility effects scheduler that may be used to control the test sequence of an MU-MIMO mobility test system.

Referring to FIG. 8, an embodiment of mobility effects scheduler 245 is shown in block diagram form. Scheduling logic 260 may implement various kinds of task scheduling decisions, possibly based on task sequences stored in scheduling sequence memory 261, that may dictate different actions to be performed at different times according to the desired test procedure to be conducted. Protocol handshake trigger 262 may process indications 263 from a protocol engine (for instance, MU protocol engine 241 depicted in FIG. 7) and generate triggers to scheduling logic 260 in connection with packets or packet exchanges that may be performed as part of the wireless protocol being implemented by the MU-MIMO wireless TGA. For example, protocol handshake trigger 262 may trigger scheduling logic 260 when a sounding exchange is initiated by the DUT. Scheduling logic 260 may integrate the inputs from protocol handshake trigger 262 and scheduling sequence memory 261 and output control commands to multi-client context manager 264, which may further integrate these control commands with parameters read from MU client context memory 275 to control scheduling activity on a per client basis. For example, scheduling logic 260 may output a control command at a predetermined time (as for instance when a control function is to be performed at a known point), when a predetermined packet is received (as for instance if the DUT transmits a sounding packet to wireless TGA 200), or at a predetermined time after a protocol function is performed (as for instance a predetermined delay after the DUT completes a sounding exchange). It will be apparent that by suitably programming scheduling logic 260, it may be possible to orchestrate an MU-MIMO test sequence according to both desired time intervals and DUT responses.

Multi-client context manager 264 may, when receiving control commands from scheduling logic 260, look up the appropriate client context in MU client context memory 275 and translate these control commands into individual actions to be performed by different functional blocks within wireless TGA 200 depicted in FIG. 7. Multi-client context manager 264 may then further issue commands to processing functions, that may in turn produce control signals to various functional blocks as represented in FIG. 7. As exemplified in FIG. 8, these processing functions may include: test traffic control function 265 that may output generation commands 266 to MU test traffic generator 220, which may start, stop, or change test traffic streams; test traffic analysis control function 267 that may output analysis commands 268 to MU test traffic analyzer 240, which may trigger traffic analysis to be performed on one or more traffic streams; protocol effects injection function 269 that may send protocol commands 268 to MU protocol engine 241, which may cause selected wireless protocol handshakes to be initiated; channel impairment injection function 271 that may send channel impairment selection commands 272 to channel impairment simulator 243, which may select an impairment to be applied to a stored simulated channel prior to reporting it via a sounding exchange with the DUT; and transmit channel model parameter select function 273 that may send simulator control commands 274 to MIMO transmit channel simulator 225, which may modify the simulated RF channel imposed on transmitted test data traffic between the wireless TGA and the DUT on a per-client basis.

In another aspect of an embodiment, channel impairment simulator 243 may simulate the effect of different clients located at different distances from the DUT. In general if a client is located further away from the DUT, it may report a lower signal to noise ratio (SNR) in its beamforming reports than a different client located closer to the DUT. In addition, the signals received by the DUT from the former client may be received with lower signal strength than signals from the latter client. One response by a DUT might be to increase the average signal power used to transmit signals to a more distant client while lowering the signal power for other nearer clients. However, this may lead to a substantial increase in the dynamic range required from the DUT transmitter, making it more difficult to design and manufacture. Therefore, in an MU-MIMO system, it may become advantageous to test the ability of the DUT to cope with such test scenarios. This may be accomplished by suitably modifying the average SNR of the channel reported in the beamforming reports returned to the DUT by sounding packet processor 242, which in turn is controlled by impairment injection function 271 according to per-client parameters stored in MU client context memory 275 and selected by multi-client context manager 264. Further realism in the simulation may be achieved by suitably modifying the average output power used by each simulated MU client by MIMO transmit channel simulator 225, which in turn may be handled by the injection of transmit channel model parameters on a per-client basis by transmit channel model parameter select function 273. These two impairments may be co-ordinated by mobility effects scheduler 245.

In yet another aspect of an embodiment, channel impairment simulator 243 may simulate the effect of a non-flat RF channel, i.e., an RF channel that has different SNR at different frequencies across the RF bandwidth. Such an impairment may be present in indoor RF channels with wide delay spreads and consequent interference effects, which may occur when many metallic scatterers are present. Particularly, this may occur when the bandwidth of the communication system approaches the coherence bandwidth of the RF channel. A non-flat channel may selectively impair certain subcarriers of an Orthogonal Frequency Division Modulation (OFDM) transmission scheme, in turn causing a high bit error rate. It may in fact become necessary for a transmitter to select a different set of channel modes or to select a different modulation format in order to overcome the effect of a non-flat channel. However, this impairment may not be present in all of the paths between the transmitter and associated receivers. Therefore, in an MU-MIMO system, it may become advantageous to test the ability of the DUT to cope with some MU clients reporting non-flat channels in their beamforming reports while other MU clients report flat channels. This may also be accomplished by suitably controlling the injection of channel impairments within channel impairment injection function 271, and may further be improved by controlling the injection of transmit channel model parameters by transmit channel model parameter select function 273, and may be carried out in a co-ordinated manner by mobility effects scheduler 245.

One approach to simulating the mobility of one or more simulated MU wireless clients communicating with a wireless DUT may be to force the DUT to perform a sounding packet exchange and modify the channel parameters returned within the beamforming report packet sent to the DUT. The channel parameters so returned may be modified to represent a different spatial position for the simulated MU wireless client relative to that represented before the sounding packet exchange. From the perspective of the DUT, if the reported channel parameters differ from that previously reported, and the RF channel model applied to the transmit signal generated by wireless TGA 200 (for instance, by MIMO transmit channel simulator 225) correlates with the reported channel parameters, then the net effect may be indistinguishable from spatial movement in an actual RF environment.

Figure 9:
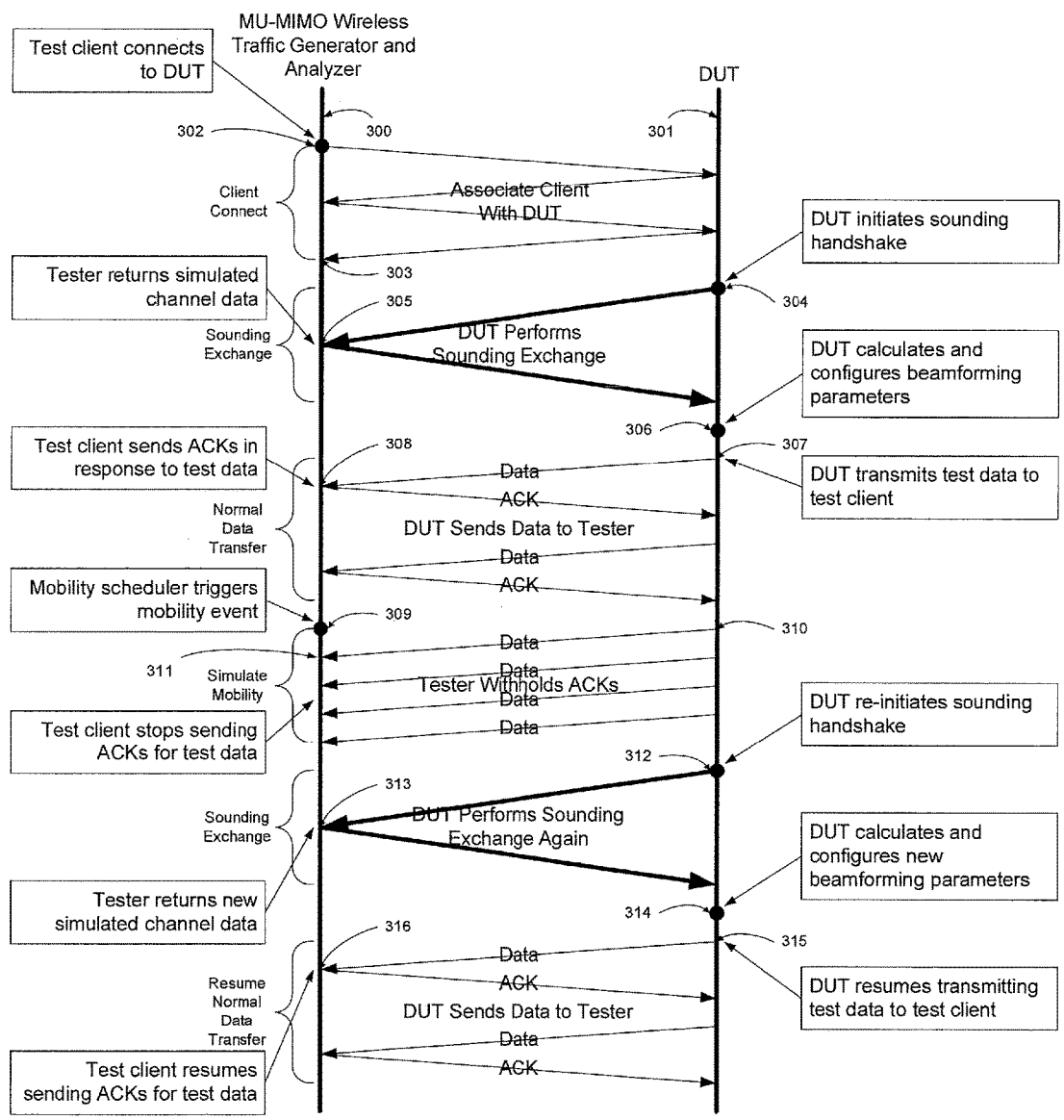
FIG. 9 depicts an illustrative sequence diagram combining channel sounding measurements and data traffic during MU-MIMO mobility testing.

FIG. 9 depicts a sequence diagram representing a possible means of using sounding packet exchanges as part of the simulation of mobility. In the figure, the MU-MIMO wireless TGA actions are represented along line 300, while the corresponding DUT actions are represented along line 301. At 302, a test client simulated by the wireless TGA may connect to the DUT. For example, in the case of protocols such as IEEE 802.11, connection may represent the client association process. The DUT may respond to the connection, and the test client may be deemed connected at 303. At 304, the DUT may initiate a sounding handshake to the test client in order to determine the parameters of the intervening RF channel. This sounding handshake may include the transmission of a sounding packet (such as a Null Data Packet or NDP for IEEE 802.11) by the DUT to the test client, which is received by the test client at 305. The test client may calculate the simulated channel matrix and transmit a beamforming report packet to the DUT. The DUT may then receive and process the beamforming report packet and configure the necessary transmit parameters for the test client at 306.

At 307, the DUT may transmit some test data to the test client. In an aspect of an embodiment, this may be caused to happen by test configuration and management system 205 in FIG. 6 commanding wired TGA 204 to transmit test data to wired interface 203 of DUT 201, which in turn may cause DUT 201 to process and forward the test data over its wireless interface 202 to wireless TGA 200. The actual method whereby the DUT is caused to send test data to the wireless TGA is not relevant to this description. When a test data packet is received, for example at 308, the wireless TGA may respond with an acknowledgement. This process of transmitting packets and returning acknowledgements may continue for any desired length of time.

At point 309, a mobility effects scheduler (for example, mobility effects scheduler 245 in wireless TGA 200) in the wireless TGA may trigger a mobility event, wherein the test client may be required to simulate the effect of moving from one spatial location to another and changing the intervening RF channel as a result. After the mobility event is triggered and processed, the DUT may transmit a further test data frame for the test client to the wireless TGA at 310; however, the wireless TGA may withhold the normal acknowledgement packet at 311, thereby simulating the effect of failing to receive the test data frame as a consequence of the latter being encoded for an outdated RF channel. The DUT may continue to transmit the same or additional test data packets, but the wireless TGA may continue to withhold acknowledgements. Effectively, this may simulate an increased frame error ratio (FER) experienced by the test data packets as a consequence of the DUT using the wrong beamforming matrix parameters after RF channel changes.

At 312, the DUT may determine that the test client may have moved, and may perform another sounding handshake. The wireless TGA may receive the sounding packet from the DUT at 313 and return a beamforming report packet with a different set of parameters corresponding to the new simulated channel matrix. The DUT may then recalculate new beamforming parameters at 314 corresponding to the new simulated channel and reconfigure its transmitter. At 315, the DUT may resume transmitting test data to the test client; as the new parameters corresponding to the test client's new simulated spatial location are being used, the wireless TGA may respond to transmitted test data packets with acknowledgment packets at 316. Normal data transfer may then be resumed.

The effect of the sequence of operations in FIG. 9 may be to simulate the process of a client moving about in an actual RF environment. In the figure, the mobility event has been illustrated as being triggered for one client. However, it is evident to one of ordinary skill in the art that it may be triggered for multiple clients as well; for example, depending on the configuration set into multi-client context manager 264 of mobility effects scheduler 245 in FIG. 8. Each test client may independently trigger a sounding exchange to itself by the DUT, and may independently respond with different beamforming report parameters. Therefore, it may be possible to set up test scenarios wherein different MU clients simulate moving about at arbitrary times and independently of one another, while receiving test data from the DUT. Further, it may be possible to link such simulated spatial mobility activities by the test clients with test traffic generation and analysis, and thereby perform more comprehensive testing of MU-MIMO performance in dynamic environments.

Figure 10:
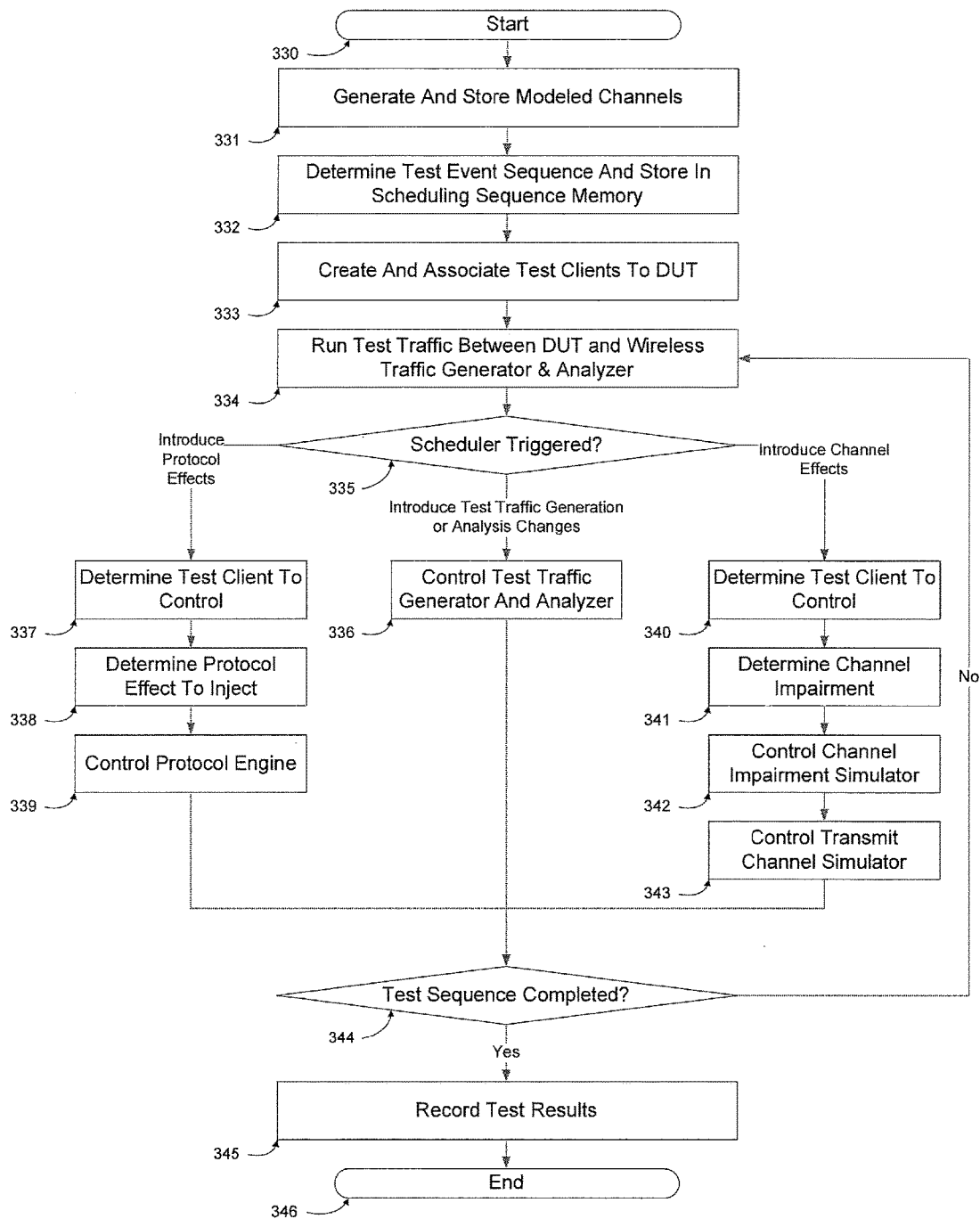
FIG. 10 shows an exemplary flowchart illustrating the simulation of channel effects combined with protocol behavior during MU-MIMO testing.

Turning now to FIG. 10, an embodiment of a general method for simulating the effects of MU-MIMO mobility may be represented as a flowchart following the steps of:

a) At step 330, beginning the test sequence;

b) At step 331, generating and storing one or more channels that may be desired to be simulated as existing at different times between a test client or clients and a DUT (for example, into simulated channel storage 244 of wireless TGA 200 in FIG. 7);

c) At step 332, determining the test event sequence to be performed for a test being conducted, such as the sequence of mobility events to inject, and storing the test event sequence into a scheduling sequence memory (for example, into scheduling sequence memory 261 of mobility effects simulator 245 in FIG. 8);

d) At step 333, creating one or more test clients, setting their context and configuration into the wireless TGA, and associating them with the DUT;

e) At step 334, running test traffic between the DUT and a wireless TGA to begin the test;

f) At step 335, determining if the scheduler needs to trigger a scheduled event, and, if so, determining what type of event to trigger;

g) At step 336, if no event is to be triggered, continuing to generate test traffic to the DUT and analyze received traffic from the DUT;

h) At step 337, if a protocol effect is to be introduced, for example a sounding packet exchange, determining a test client to inject the protocol effect for;

i) At step 338, determining the protocol effect to be introduced and then determining the control commands to issue;

j) At step 339, controlling a protocol engine with appropriate control commands to cause the protocol effect to be introduced;

k) At step 340, if a channel effect is to be introduced, for example a change in transmitted RF channel parameters, determining a test client to inject the channel effect for;

l) At step 341, determining the channel effect to be introduced and then determining the control commands to issue;

m) At step 342, controlling a channel impairment simulator to introduce the channel effect into the beamforming feedback resulting from a sounding packet exchange;

n) At step 343, controlling a transmit channel simulator to introduce the channel effect into packets transmitted by a wireless TGA to the DUT;

o) At step 344, determining if the test sequence has been completed, and, if not, continuing to run traffic and introduce effects;

p) At step 345, if the test sequence has been completed, recording the test results; and q) At step 346, ending the process.

The procedure outlined in FIG. 10 may be applied to a variety of test scenarios pertaining to MU-MIMO mobility testing. Different types of MU-MIMO mobility tests may be implemented by suitably selecting different protocol effects and channel effects to be introduced, as well as selecting different types of test traffic to be generated and different analysis functions to be performed. These selections may be performed according to the desired test procedure and stored in wireless TGA 200. During the course of the test, mobility effects scheduler 245 may follow the predetermined test procedure and use these selections to control the various elements of wireless TGA 200 so as to apply the correct stimuli to the DUT and measure the expected responses. Such stimuli may include FER increase simulation by withholding acknowledgements for test data packets received from the DUT, or inducing FER at the DUT by modifying the transmit channel models applied to test data packets transmitted to the DUT. Other stimuli, including frame exchanges and protocol behaviors, may also be applied, as will be evident to those of ordinary skill in the art.

It is apparent that the procedure outlined in FIG. 10 may link wireless protocol behavior with sounding behavior, and may also link wireless protocol behavior with simulated RF channels. The wireless protocol effect to be injected or the channel impairment to be injected may be: triggered by a system stimulus such as the receipt of a particular packet or protocol handshake from the DUT; caused to happen at a pre-set time; or a combination of both.

Figure 11:
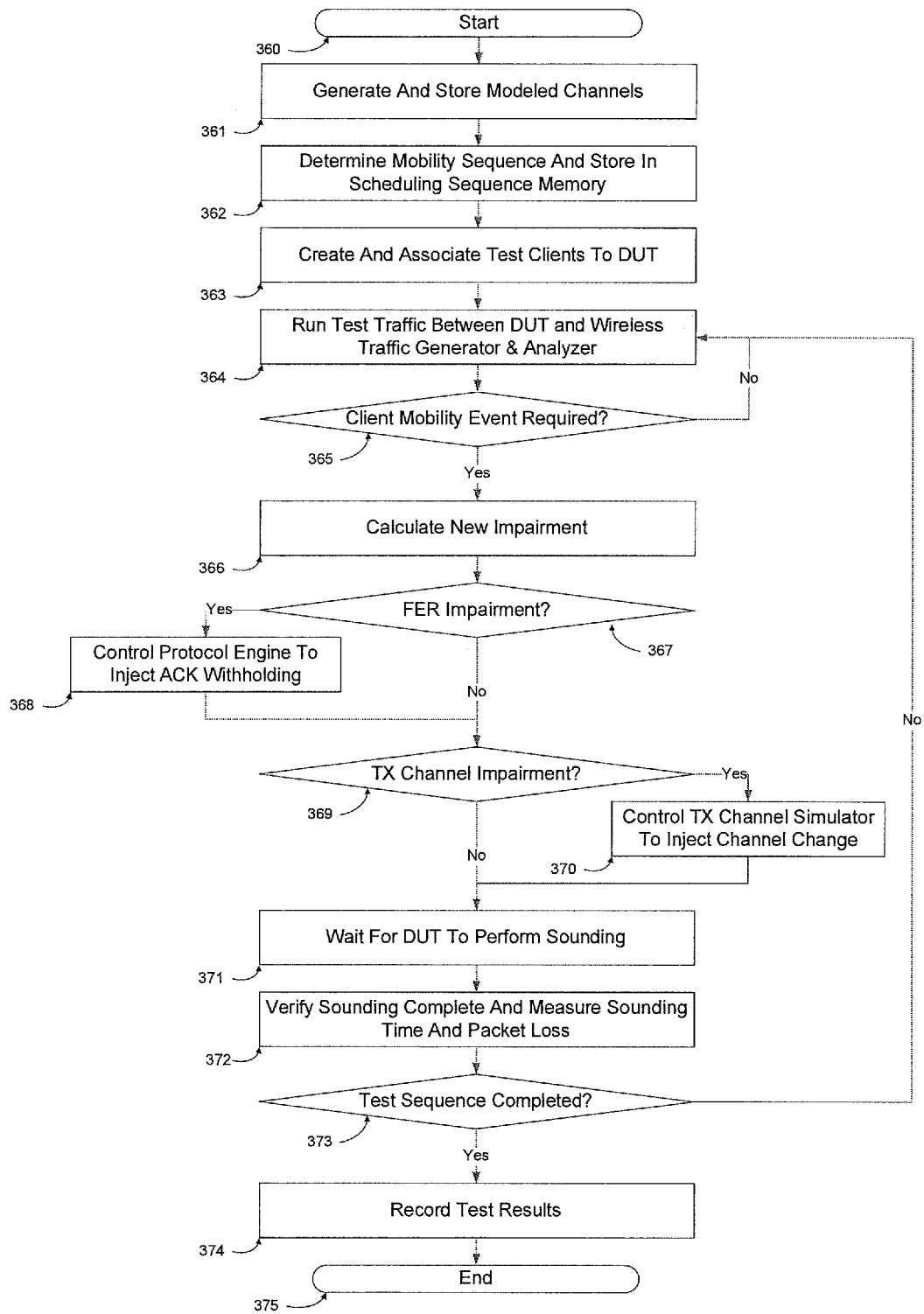
FIG. 11 depicts an exemplary flowchart for the simulation of MU-MIMO mobility by a MU-MIMO mobility test system.

An exemplary flowchart for performing measurements related to the sounding updates performed by a DUT is depicted in FIG. 11. It may comprise the steps of:

a) At step 360, beginning the test sequence;

b) At step 361, generating and storing one or more channels that may be modeled as existing between the test client or clients and the DUT;

c) At step 362, determining the sequence of mobility events to perform, and storing the sequence into a scheduling sequence memory;

d) At step 363, creating and associating one or more test clients with a DUT, prior to starting the actual test;

e) At step 364, initiating test traffic between a DUT and a wireless TGA;

f) At step 365, determining if a scheduler needs to trigger a client mobility event, and further determining which client or clients the event must be triggered for;

g) At step 366, calculating a new impairment or set of impairments to be applied in order to simulate the mobility of a client or clients;

h) At step 367, determining if an FER impairment or set of FER impairments need to be applied;

i) At step 368, for each client for which an FER impairment needs to be applied, controlling a protocol engine to inject an FER impairment for that client by withholding acknowledgements;

j) At step 369, determining if a transmit channel impairment or set of transmit channel impairments needs to be applied;

k) At step 370, for each client for which a transmit channel impairment is to be applied, controlling a transmit channel simulator to apply a different channel model to transmitted test data frames for that client;

l) At step 371, waiting for the DUT to initiate a sounding exchange, and possibly starting a timer to measure the delay to initiation;

m) At step 372, verifying that the DUT has completed a valid sounding exchange, possibly stopping a timer, and measuring the time delay to initiate sounding and the time required to complete a sounding exchange, and possibly further measuring packet losses that may have occurred while the DUT is performing sounding calculations;

o) At step 373, determining if the mobility test sequence has been completed, and, if not, continuing to run traffic and introduce effects;

p) At step 374, if the test sequence has been completed, recording the test results; and q) At step 375, ending the process.

In an aspect of an embodiment, the procedure depicted in FIG. 11 may be adapted to measure the time delay between the injection of an impairment, and the completion of a sounding exchange by the DUT in response to that impairment. Such a measurement may be useful for assessing the ability of a DUT to respond quickly to a mobile MU client. The measurements may be extended to include the injection of impairments for multiple MU clients concurrently, and may therefore provide an assessment of the ability of the DUT to cope with a dynamic environment containing several mobile MU clients.

In another aspect of an embodiment, the procedure depicted in FIG. 11 may be adapted to measure the maximum rate at which impairments may be injected while still allowing a DUT to successfully detect their injection and complete sounding exchanges in response. Such a measurement may be useful for determining the performance of the DUT in terms of the maximum number of mobility events that can be sustained in unit time. It is apparent that other types of measurements related to the timing or rate of sounding behavior may be performed.

In yet another aspect of an embodiment, test procedure exemplified in FIG. 11 may be repeated, but the offered load of test traffic that is being run between the DUT and the wireless TGA may be progressively increased during each run. Within each run, the rate at which impairments are injected may be increased over successive iterations. The level of packet loss and the maximum number of mobility events that can be sustained in unit time may then be measured. The result may be provided as a table or chart plotting packet loss and maximum rate of mobility events as a function of offered load of test traffic, which may enable the assessment of the capability of the DUT to transport traffic without loss while still performing sounding measurements at high rates.

It may also be desirable to assess the ability of the DUT to maximize the utilization of the MU-MIMO RF channel environment by proper scheduling of transmitted MU-MIMO packets. Various degrees of freedom may be available to the DUT during scheduling, such as the number of MU clients targeted within a single MU transmission period, the selection of test data packets to be combined in the transmission period, the physical layer (PHY) modulation rates used for the different packets, the degree of MIMO used for each test data packet, etc. All of these degrees of freedom may have significant impact on the utilization of the wireless medium, and therefore may need to be considered simultaneously by the DUT when calculating its traffic scheduling parameters for each packet transmission opportunity. It is therefore of interest to determine how well the DUT is able to schedule mobile MU clients and adapt its transmission rates to these clients while maintaining maximum throughput.

Figure 12:
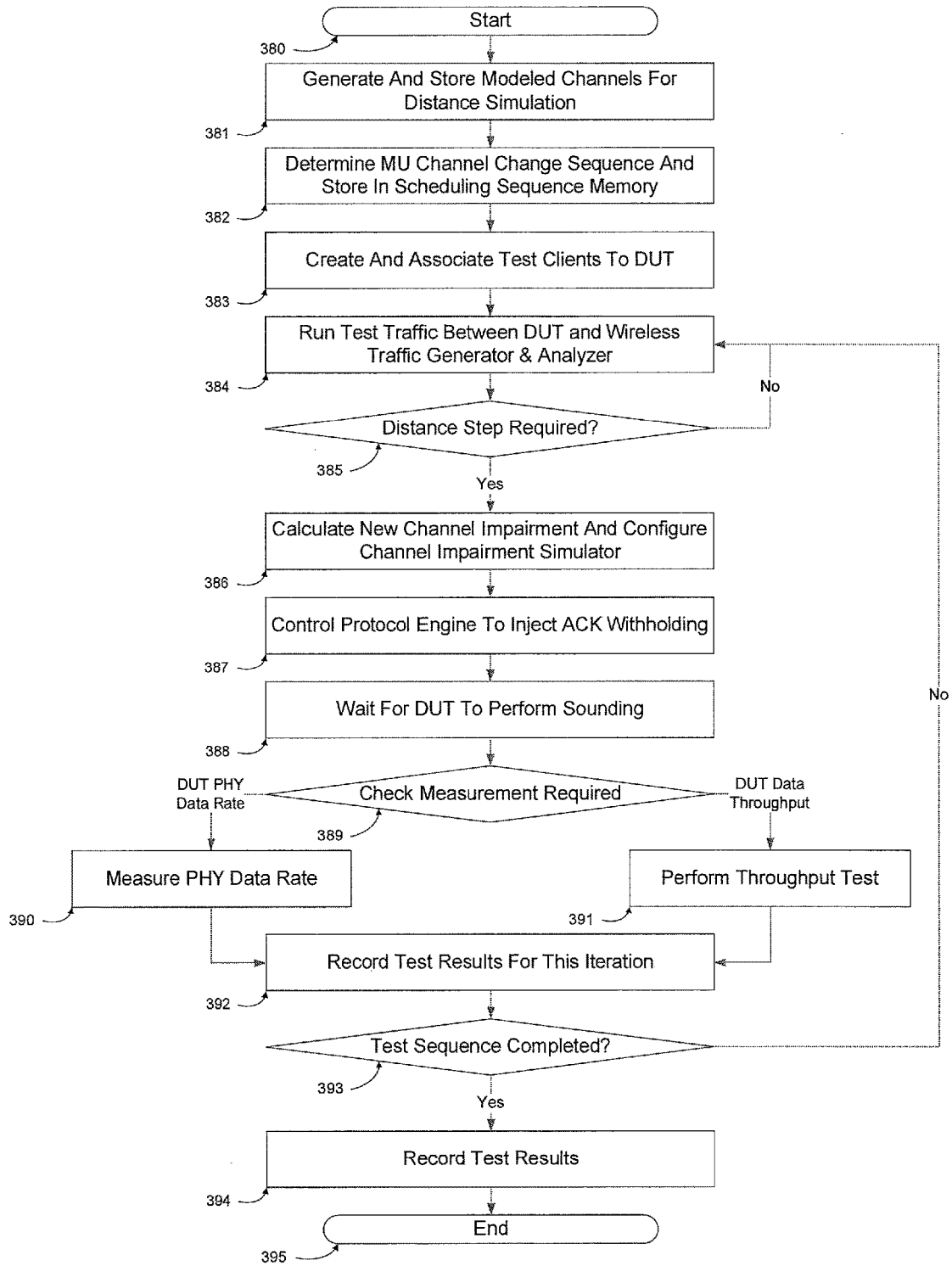
FIG. 12 depicts an exemplary flowchart for the measurement of physical data rate adaptation or data throughput while performing MU-MIMO mobility simulation.

Referring to FIG. 12, an exemplary flowchart depicting an iterative test procedure for measuring PHY rate adaptation and data throughput is shown. The measurement may comprise the steps of:

a) At step 380, beginning the test sequence;

b) At step 381, generating and storing one or more channels that may be modeled as existing between the test client or clients and the DUT, with the SNR on the different channels being modeled to represent different distances;

c) At step 382, determining the sequence of channel change events to perform, and storing the sequence into a scheduling sequence memory;

d) At step 383, creating and associating one or more test clients with a DUT;

e) At step 384, initiating test traffic between a DUT and a wireless TGA;

f) At step 385, determining if the scheduler needs to trigger a distance step event, and further determining which client or clients the event must be triggered for;

g) At step 386, calculating a new channel impairment consonant with the new distance specified by the distance step event, and configuring a channel impairment simulator with the new channel impairment;

h) At step 387, controlling a protocol engine to inject an acknowledgement withholding protocol effect, to simulate an increased FER resulting from one or more clients moving to new spatial locations;

i) At step 388, waiting for the DUT to initiate and complete a channel sounding sequence to the client or clients that have been simulated to move;

j) At step 389, checking for the measurement to be performed;

k) At step 390, if a rate adaptation measurement is being performed, measuring the PHY data rate of the DUT;

l) At step 391, if a data throughput measurement is being performed, controlling a traffic generator and analyzer to perform a throughput test on the DUT;

m) At step 392, recording the results of the current iteration;

o) At step 393, determining if all iterations of the test sequence has been completed, and, if not, returning to perform the next iteration;

p) At step 394, if all iterations have been completed, recording the test results; and q) At step 395, ending the process.

In an aspect of an embodiment, the test procedure outlined in FIG. 12 may allow the rate adaptation of a DUT to be measured by progressively increasing the simulated distance between the DUT and one or more simulated MU test clients (e.g., by progressively degrading the SNR) over successive iterations, and recording the PHY data rates used by the DUT to transmit traffic to these test clients. An exemplary result obtained from such a test may be a table or chart plotting PHY data rate as a function of distance, which may serve to assess the capability of the DUT to smoothly decrease PITY data rate to compensate for increasing distance.

In another aspect of an embodiment, one set of simulated static MU clients may be presented to the DUT with constant SNR during the test, while another set of simulated mobile MU clients may have their SNR progressively degraded. The test may record the frame errors experienced by the traffic directed to the static MU clients as a function of the SNR disparity between the mobile and static MU clients. Such a test may provide an assessment of the dynamic range capability of the DUT under MU mobility conditions. The test may further provide an assessment of the ability of DUT to schedule clients in such a way that its dynamic range limitations are not exceeded under different combinations of near and far MU clients.

In yet another aspect of an embodiment, throughput measurements may be made between the DUT and one or more simulated MU clients as the simulated distance between the DUT and the MU clients is progressively increased in iterations. An exemplary result obtained from such a test may be a table or chart of the throughput values plotted as a function of distance. Such a result may serve to assess the capability of the DUT to maximize the use of the RF channel by optimally scheduling packets during transmission opportunities.

It will be apparent to those of ordinary skill in the art that the embodiments and aspects described herein may be applicable to a number of wireless technologies and communication protocols, such as the IEEE 802.11 and Long Term Evolution (LTE) protocols. In the case of IEEE 802.11, acknowledgements may be withheld under control of a mobility effects scheduler to trigger sounding packet exchanges, and beamforming reports may be modified to simulate the effect of clients at different distances. In the case of LTE, radio measurement reports may be returned to the DUT under control of a mobility effects scheduler by simulated LTE User Equipment (UE) mobile terminals. It will be appreciated that certain aspects of the embodiments described herein may improve the repeatability of testing performed. It will further be appreciated that certain aspects of the embodiments described herein may be applicable to the testing of non-MU wireless technologies. For example, an embodiment may include a mobility effects scheduler and channel impairment simulator within a wireless TGA for testing beamforming exchanges within IEEE 802.11n MIMO technology.

It will be apparent to those of ordinary skill in the art that, in accordance with the aspects and embodiments described herein, different combinations of orthogonal and non-orthogonal RF channel models may be assigned to simulated MU clients, and reported to the DUT in beamforming reports as well as imposed upon transmitted data frames by the wireless TGA. Further, a client may simulate a transition from an orthogonal RF channel to a non-orthogonal RF channel by suitably adjusting the parameters assigned to that client by a channel impairment simulator. It will also be apparent that combinations of flat and non-flat RF channel models may be applied to the various simulated MU clients in the same manner. Advantageously, this may enable testing of the maximum throughput attainable by the DUT with multiple clients located at different spatial positions within a simulated RF environment. It may also enable testing of the ability of the DUT to appropriately group clients with orthogonal RF channels relative to each other into the same MU-MIMO transmit opportunity so as to maximize RF channel utilization.

It will also be appreciated by those of ordinary skill in the art that search algorithms, such as a binary search, may be used in conjunction with the procedures outlined in herein. For example, a search algorithm may be utilized in conjunction with the exemplary procedure described in FIG. 11 for measuring the ability of the DUT to respond to sounding updates at a specified rate. Advantageously, this may enable the accurate measurement of the absolute maximum rate at which the DUT can cope with sounding handshakes under various circumstances.

The subject matter described herein improves the technological field of multi user MIMO wireless testing. The subject matter described herein is implemented on a particular machine, namely, a MU-MIMO wireless traffic generator and analyzer. The subject matter described herein improves the functionality of a wireless traffic generator and analyzer by testing various aspects of MU-MIMO communications, including sounding packet exchanges, channel impairment, mobility, etc.

It will yet further be appreciated by those of ordinary skill in the art that the number of MU clients presented to the DUT during a test conducted according to the exemplary procedure outlined in FIG. 11 may be progressively modified in accordance with a search algorithm until the point at which the DUT cannot accept any additional MU clients has been established. Advantageously, this may simplify the measurement of the maximum MU client capacity of the DUT.

Accordingly, while the subject matter herein has been described with reference to illustrative embodiments, this description is not intended to be construed in a limiting sense. Various modifications of the illustrative embodiments, as well as other aspects or embodiments of the subject matter described herein, will be apparent to persons of ordinary skill in the art upon reference to this description. These modifications shall not be construed as departing from the scope of the subject matter described herein, which is defined solely by the claims appended hereto.

What is claimed is:

1. A system for testing a wireless data communication device under test (DUT), comprising:
   a packet transmission datapath for transmitting packetized data streams to said DUT;
   a packet reception datapath for receiving packetized data streams from said DUT;
   a protocol engine coupled to said packet transmission datapath and said packet reception datapath, and operative to implement a communication protocol;
   a sounding packet processor coupled to said packet transmission datapath and said packet reception datapath, and operative to perform channel sounding packet exchanges with said DUT; and
   a mobility effects scheduler coupled to said protocol engine and said sounding packet processor;
   wherein said mobility effects scheduler triggers said protocol engine and said sounding packet processor to perform a first sounding packet exchange at a predetermined time.

2. The system of claim 1, wherein said sounding packet processor is further adapted to simulate a channel impairment.

3. The system of claim 1, wherein said first sounding packet exchange is triggered by simulating an increased bit error ratio in packets received from said DUT.

4. The system of claim 3, wherein said increased bit error ratio is simulated by withholding acknowledgements to said packets received from said DUT.

5. The system of claim 1, wherein said packet transmission datapath contains a transmit channel simulator, and said first sounding packet exchange is triggered by modifying the channel being simulated by said transmit channel simulator.

6. The system of claim 1, wherein said mobility effects scheduler is adapted to trigger said sounding packet exchange to report a change in channel parameters.

7. The system of claim 6, wherein said change in channel conditions simulates mobility.

8. The system of claim 1, wherein said system is adapted to implement Multiple Input Multiple Output (MIMO) wireless data communication.

9. The system of claim 8, wherein said system simulates multiple wireless clients.

10. The system of claim 9, wherein said system is further adapted to implement Multi User MIMO (MU-MIMO) wireless data communications.

11. The system of claim 10, wherein said sounding packet processor is conditioned to simulate different channel impairments for different simulated wireless clients.

12. A method of testing a multi user multiple input multiple output (MU-MIMO) wireless device under test (DUT) supporting a communication protocol, the method comprising:
   simulating at least one MU-MIMO wireless client supporting said communication protocol and associated with said DUT;
   generating at least one first sounding matrix corresponding to said at least one MU-MIMO wireless client;
   returning said at least one first sounding matrix responsive to a first sounding exchange by said DUT;
   generating at least one second sounding matrix corresponding to said at least one MU-MIMO wireless client;
   triggering a second sounding exchange by said DUT;
   returning said at least one second sounding matrix responsive to said second sounding exchange; wherein
   said at least one second sounding matrix is modified to simulate a spatial movement of said at least one MU-MIMO wireless client.

13. The method of claim 12, wherein the signal to noise ratio (SNR) of said at least one second sounding matrix is modified to simulate said spatial movement.

14. The method of claim 13, wherein the average value of said SNR of said at least one second sounding matrix is modified to simulate a change in absolute distance between said at least one MU-MIMO wireless client and said DUT.

15. The method of claim 13, wherein said communication protocol is orthogonal frequency division multiplexing (OFDM), and said modification to said SNR comprises changing the relative SNR between subcarriers of said OFDM communication protocol.

16. A method of testing a multi user multiple input multiple output (MU-MIMO) wireless device under test (DUT), the method comprising:
   simulating at least one MU-MIMO wireless client associated with said DUT;
   generating at least one first sounding matrix corresponding to said at least one MU-MIMO wireless client;
   returning said at least one first sounding matrix responsive to a first sounding exchange by said DUT;
   generating at least one second sounding matrix corresponding to said at least one MU-MIMO wireless client;
   triggering a second sounding exchange by said DUT;
   returning said at least one second sounding matrix responsive to said second sounding exchange; wherein
   the interval between said first sounding exchange and said triggering of said second sounding exchange is modified.

17. The method of claim 16, wherein the time required to complete said second sounding exchange is measured.

18. The method of claim 16, wherein said interval is modified in accordance with a search algorithm.

19. The method of claim 18, wherein said search algorithm is used to determine the rate at which said DUT can perform sounding exchanges.

\* \* \* \* \*